United States Patent
Hirata

(10) Patent No.: US 6,487,129 B2
(45) Date of Patent: Nov. 26, 2002

(54) SEMICONDUCTOR APPARATUS

(75) Inventor: Yoichi Hirata, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 10/093,800

(22) Filed: Mar. 11, 2002

(65) Prior Publication Data

US 2002/0093853 A1 Jul. 18, 2002

Related U.S. Application Data

(62) Division of application No. 09/649,067, filed on Aug. 29, 2000, now Pat. No. 6,377,493.

(30) Foreign Application Priority Data

Aug. 31, 1999 (JP) ............................................. 11-244718
Jun. 27, 2000 (JP) ........................................ 2000-192278

(51) Int. Cl.[7] ................................................ G11C 7/00
(52) U.S. Cl. .................... 365/189.07; 365/94; 365/103; 365/189.01
(58) Field of Search ....................... 365/189.01, 189.07, 365/94, 103

(56) References Cited

U.S. PATENT DOCUMENTS

| 4,651,275 A | 3/1987 | McDonough |
| 5,168,151 A | * 12/1992 | Nara .......................... 235/492 |
| 5,479,342 A | 12/1995 | Sakamoto et al. |
| 5,619,678 A | 4/1997 | Yamamoto et al. |
| 5,701,506 A | * 12/1997 | Hosota ........................ 395/800 |
| 5,926,620 A | 7/1999 | Klein |
| 5,930,523 A | 7/1999 | Kawasaki et al. |
| 6,006,313 A | 12/1999 | Fukumoto |
| 6,201,728 B1 | 3/2001 | Narui et al. |
| 6,212,620 B1 | 4/2001 | Kawasaki et al. |
| 6,377,493 B1 | * 4/2002 | Hirata ................... 365/189.07 |
| 2002/0032891 A1 | * 3/2002 | Yada et al. ................. 714/766 |

FOREIGN PATENT DOCUMENTS

| EP | 0615187 | 9/1994 |
| EP | 0640916 | 3/1995 |
| JP | 360145596 A | 8/1985 |
| JP | 63-10234 | 1/1988 |
| JP | 1-192096 | 8/1989 |
| JP | 401192096 A | 8/1989 |
| JP | 402040716 A | 2/1990 |
| JP | 403071232 A | 3/1991 |
| JP | 404278299 A | 10/1992 |
| JP | 405143316 A | 6/1993 |
| JP | 05233266 A | 9/1993 |

* cited by examiner

Primary Examiner—Viet Q. Nguyen
(74) Attorney, Agent, or Firm—McDermott, Will & Emery

(57) ABSTRACT

To correct a software bug in a microcomputer for use in various electric apparatus having a mask ROM mounted therein without correcting the mask ROM.

When there is a bug in a first data, a predetermined bit of a second data is arranged to be rewritten. Thereby, the software bug of the microcomputer is corrected.

1 Claim, 5 Drawing Sheets

FIG. 3
(a)
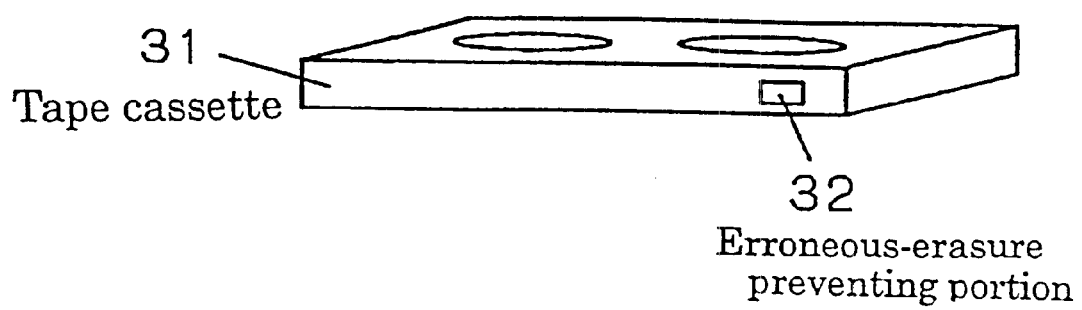
31 Tape cassette
32 Erroneous-erasure preventing portion
(b)
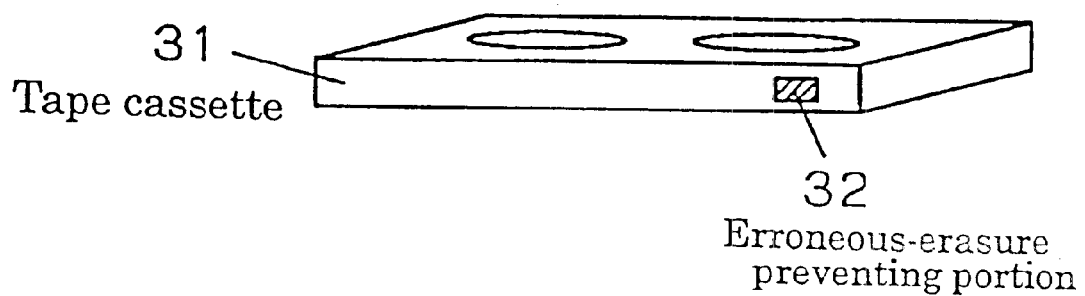
31 Tape cassette
32 Erroneous-erasure preventing portion

SEMICONDUCTOR APPARATUS

This application is a divisional of application Ser. No. 09/649,067 filed Aug. 29, 2000, now U.S. Pat. No. 6,377,493B1.

FIELD OF THE INVENTION

The present invention relates to a semiconductor apparatus capable of facilitating elimination of a bug in software of a microcomputer having a mask ROM mounted therein.

BACKGROUND OF THE INVENTION

In eliminating a software bug in a microcomputer having a mask ROM mounted therein, it is generally practiced to revise the program area by changing the mask ROM. A conventional method taken as a countermeasure against a bug in software in a microcomputer having a mask ROM mounted therein will be described.

In debugging software in a microcomputer having a mask ROM mounted therein, there has so far been used a method to fabricate the mask ROM anew or a method, having a portion of the program area of the mask ROM written into a nonvolatile memory external to the microcomputer, to rewrite the contents of the nonvolatile memory. A structure of a microcomputer is illustrated in FIG. 5. In FIG. 5, microcomputer 50 includes mask ROM 51 as a read-only memory of the program area, volatile memory RAM 52 as a data area, and CPU 53 as the central processing unit.

Heretofore, when a bug was present in a software portion of a microcomputer 50 having a mask ROM 51 mounted therein, elimination of the bug has been achieved by fabricating the mask ROM again or by writing a portion of the program area in the mask ROM 51 into a nonvolatile memory disposed external to the microcomputer.

As prior arts for removing a bug from a mask ROM, there are those disclosed in Japanese Patent Laid-open Nos. 10234/1988 and 192096/1989 and U.S. Pat. No. 5,479,342.

SUMMARY OF THE INVENTION

A semiconductor apparatus according to the present invention comprises:
- a control unit including a mask ROM having a program area with programs stored therein, a rewritable memory having a data area with data for use in execution of the program stored therein, and a central processing unit; and
- a storage unit for storing arbitrary data capable of rewriting an arbitrary data area in the memory. By virtue of the described arrangement, a bug in software can be eliminated without changing the mask ROM.

Another invention herein is a semiconductor apparatus comprising:
- a control unit with first and second data written therein; and
- a storage unit storing first and second mask data, comparison data, a source address, and a target address. Arbitrary data of the first and second mask data, the comparison data, the source address, and the target address are written into the storage unit, which has values "0" initially written therein. In the semiconductor apparatus, the first data is extracted in accordance with the source address, a first operation is performed on the first data and the first mask data, the result of the first operation is compared with the comparison data, the second data is extracted in accordance with the target address, a second operation is performed on the second data and the second mask data, and whether or not the result of the second operation is written into the second data is determined in accordance with the result of the comparison.

By virtue of the described arrangement, a software bug can be eliminated only by preparing a nonvolatile memory of a relatively small capacity and not requiring correction of the mask ROM.

BRIEF DESCRIPTION OF THE DRAWINGS

FIGS. 3(a) and 3(b) are perspective views showing appearances of a tape cassette for explanation of a semiconductor apparatus according to a second exemplary embodiment of the present invention.

DESCRIPTION OF THE PREFERRED EMBODIMENTS

An exemplary embodiment of the present invention will be described with reference to the accompanying drawings.

First Embodiment

In the present embodiment, when an electronic apparatus with a microcomputer installed therein has deviated from its normal operation, or it is desired to modify the function of the microcomputer, the wrong data as the cause of the bug, for example, in the RAM data area of the microcomputer is rewritten with correct data in the RAM by means of a nonvolatile memory externally connected to the microcomputer. Such a nonvolatile memory is previously mounted into the electronic apparatus in connection with the microcomputer. When, the electronic apparatus has deviated from its normal operation to make a malfunction, source address data and target address data for specifying an arbitrary address in the RAM at which data correction is to be made and mask data and comparison data to be used for actually executing the data correction are written into a nonvolatile memory by the user or the microcomputer engineer. After such data have been written in, rewriting of the data in the RAM is carried out by supplying power to the electronic apparatus.

In the state of the nonvolatile memory connected to the microcomputer and having the data described above not yet written therein, i.e., before the data capable of rewriting the RAM data are stored therein, there are written values "0" at each of the addresses of the nonvolatile memory.

Figure 1:
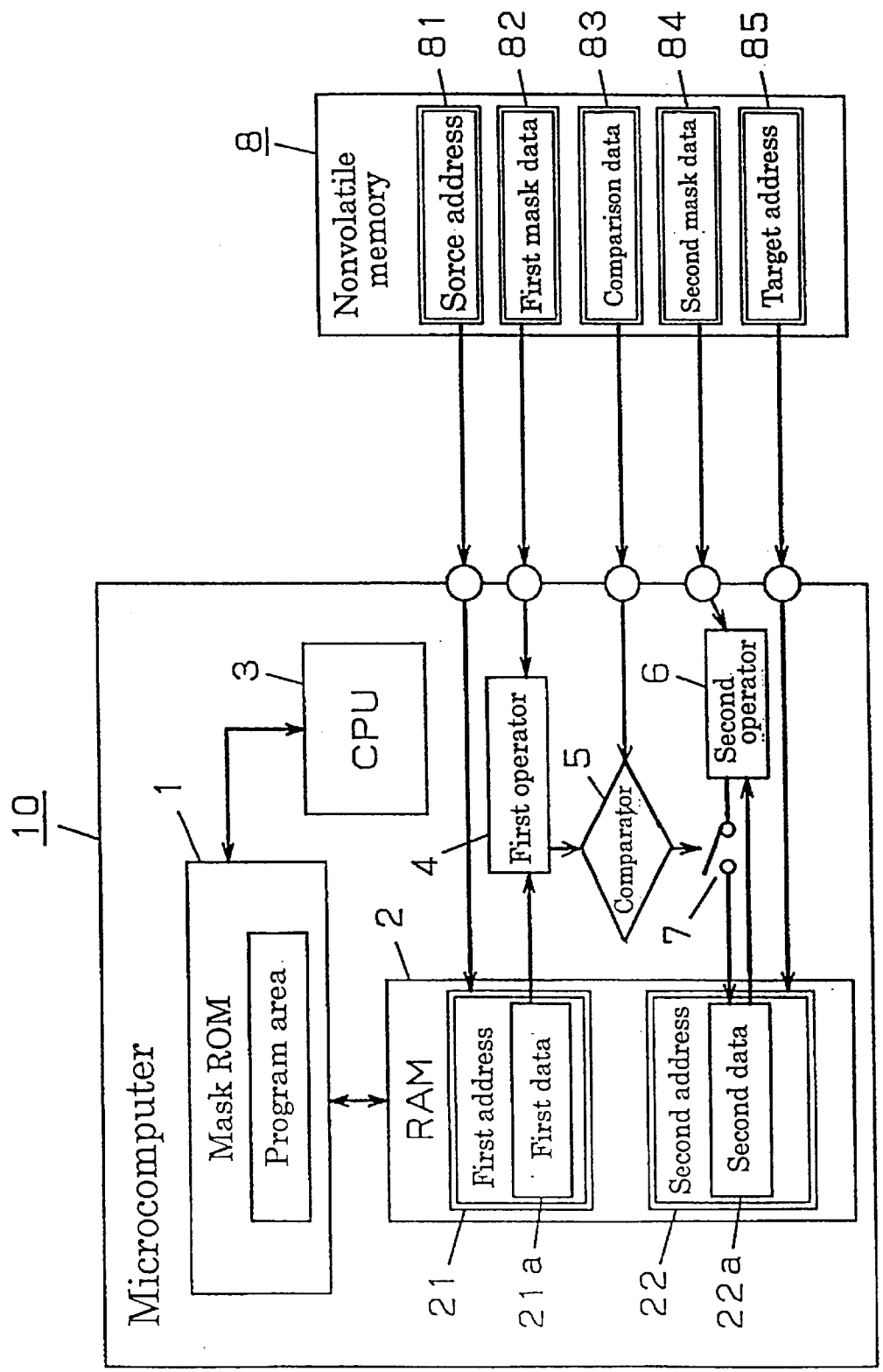
FIG. 1 is a block diagram showing a structure of a semiconductor apparatus according to a first exemplary embodiment of the present invention.
Figure 2:
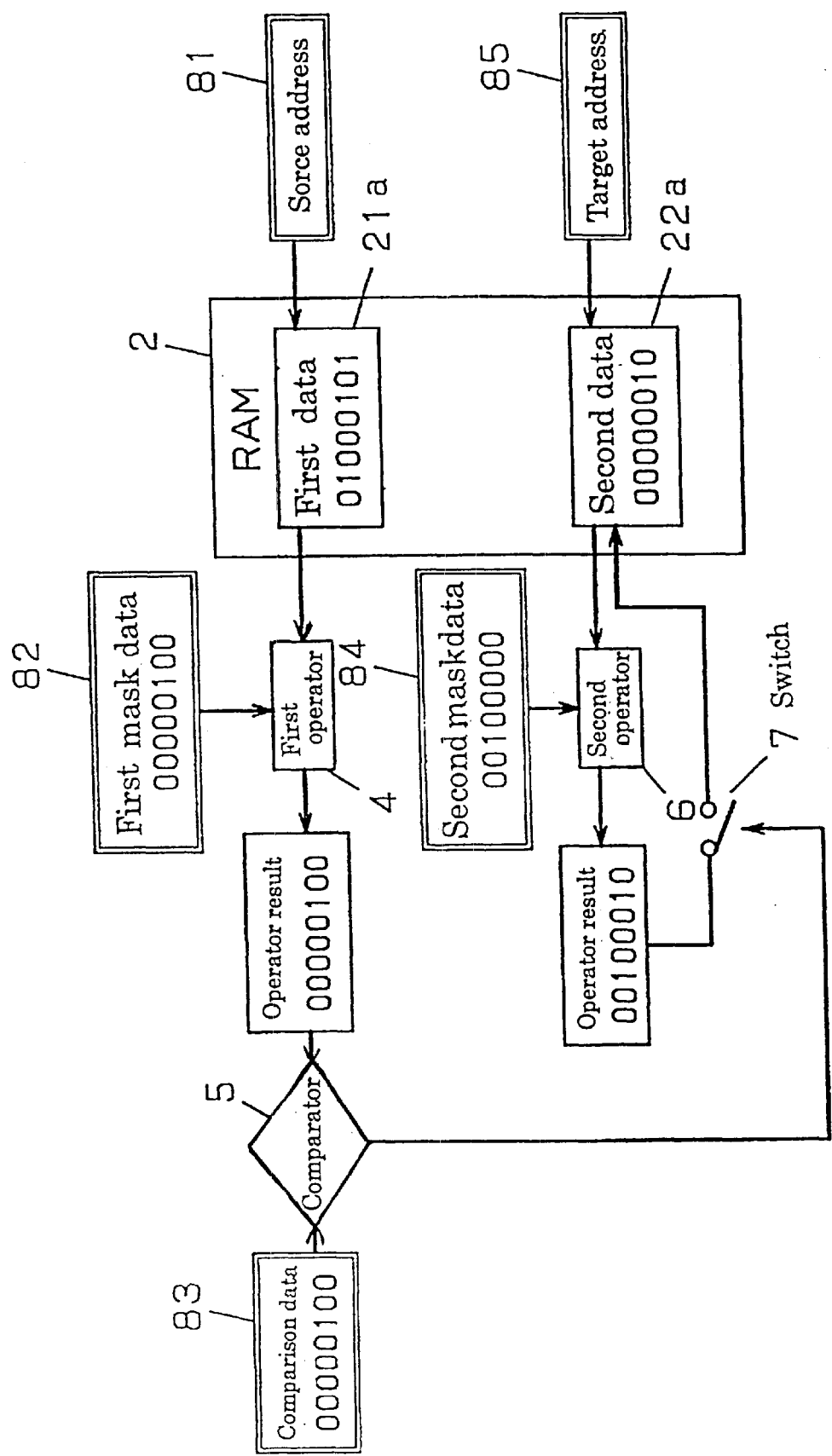
FIG. 2 is a schematic block diagram for explanation of operations of the semiconductor apparatus according to the first embodiment.

FIG. 1 is a block diagram showing a structure of the semiconductor apparatus according to a first embodiment of the invention and FIG. 2 is a block diagram schematically showing a specific configuration of the embodiment. Microcomputer 10 shown in FIG. 1 is such that is mounted on various types of electronic apparatuses for performing such functions as operation control of the electronic apparatus on which it is mounted. Externally to microcomputer 10, there is disposed nonvolatile memory 8 as a storage unit. Inside nonvolatile memory 8, there are disposed source address 81 for designating first address 21, as an arbitrary address in RAM 2, discussed later, first mask data 82 for performing an operation for extracting a predetermined bit in first data 21a at first address 21 of RAM 2, comparison data 83 to be compared with the result of the above described operation, second mask data 84 for rewriting a predetermined bit of second data 22a at second address 22 of RAM 2 with another value, and target address 85 for specifying second address 22, discussed later. These data are written in when a malfunction has occurred in the apparatus and a bug has been found in the microcomputer 10. Before the data are written in, "0" are written in as respective data.

Microcomputer 10 includes central processing unit (hereinafter referred to as CPU) 3 for performing arithmetic operations and other types of operations and RAM (Random Access Memory) 2 being a rewritable memory for recording thereon the program recorded on mask ROM 1 and data for controlling CPU 3 through mask ROM 1. The data area of RAM 2 includes first address 21 and second address 22, and it is adapted such that, when first data 21a written at first address 21 is specific data, second data 22a written at second address 22 outputs a specific result.

First operator 4 is a first operation unit for making a logical operation on first mask data 82 from nonvolatile memory 8 and first data 21a, thereby extracting a predetermined bit in first data 21a. First operator 4 mainly performs, but not limited to, multiplying operation. Comparator 5 is a comparison unit for comparing the operation result in first operator 4 with comparison data 83 from nonvolatile memory 8. Switch 7 is a switching unit for breaking (OFF)/making (ON) in accordance with the comparison result in comparator 5, thereby determining whether or not the operation result in second operator 6, discussed later, is rewritten with second data 22a. Switch 7 is turned ON when the comparison result in comparator 5 is true (namely, when the operation result in first operator 4 and comparison data 83 agree with each other) so that the predetermined bit in second data 22a is rewritten with the right value based on the operation result in second operator 6. Switch 7 is turned OFF when the comparison result in comparator 5 is false (namely, when the operation result in first operator 4 and comparison data 83 disagree) so that second data 22a is not rewritten.

Second operator 6 is a second operation unit for making a logical operation on second data 22a and second mask data 84. In the present embodiment, second operator 6 mainly performs, but not limited to, logical adding operation. Mask ROM 1 is provided within microcomputer 10 and has software for controlling CPU 3 written therein. Second operator 6, when the value of a predetermined bit in second data 22a is not correct, performs a logical operation on this bit and second mask data 84, in which the predetermined bit is set at the correct value, so that the predetermined bit of second data 22a is corrected to the right value. In this way, microcomputer 10 is constituted of mask ROM 1, RAM 2, CPU 3, first operator 4, comparator 5, second operator 6, and switch 7.

Assuming that the address and bit in RAM 2 where the cause of a bug of microcomputer 10 exists, source address 81 and first mask data 82 for extracting the address and bit where the bug exists, comparison data 83 for identifying existence of a bug, and second mask data 84 and target address 85 for rewriting data in RAM 2 are known, the microcomputer engineer previously writes necessary data into the nonvolatile memory 8.

Operation of the semiconductor apparatus of the present embodiment structured as above will be described in more detail with reference to FIG. 1 and FIG. 2.

First, microcomputer 10 is installed in an apparatus with nonvolatile memory 8 previously connected thereto. At the time of the initial installation, there are values "0" written at all the addresses of nonvolatile memory 8 so that the data within RAM 2 cannot be rewritten accidentally.

Then, when microcomputer 10 has made a malfunction or when it is desired that the function of microcomputer 10 be partly modified, it becomes necessary to change a portion of software in microcomputer 10. Since the data area within the microcomputer 10 is formed of RAM 2 in this embodiment, it is possible to rewrite the data at will. The rewriting of the data within RAM 2 is accomplished by the microcomputer engineer or user writing the data for the rewriting and the data for specifying the address where the rewriting is to be made into nonvolatile memory 8.

When the relevant data are written into nonvolatile memory 8, first address 21 as an arbitrary address in RAM 2 is chosen in accordance with source address 81 in nonvolatile memory 8, a logical operation on first data 21a written at first address 21 and first mask data 82 in nonvolatile memory 8 is performed in first operator 4, and, thereby, a predetermined bit in first data 21a is read out. The result of operation and comparison data 83 are compared in comparator 5. According to the result of comparison, switch 7 is controlled to be switched. As comparison data 83, such data that the value of a predetermined bit thereof agrees with the predetermined bit of the operation result in first operator 4 is written in. Accordingly, switch 7 is controlled to turn ON when comparison data 83 and the operation result in first operator 4 agree with each other so as to correct the value of the predetermined bit of second data 22a at second address 22.

Thus, when the data in first operator 4 and comparison data 83 agree with each other in comparator 5, switch 7 is turned ON and second data 22a is rewritten. However, when the data in first operator 4 and comparison data 83 disagree, switch 7 is turned OFF and second data 22a is not rewritten.

On the other hand, second address 22 in RAM 2 is specified with target address 85 in nonvolatile memory 8 and, thereby, a predetermined bit of second data 22a at second address 22 is read into second operator 6. In second operator 6, this bit and second mask data 84 from nonvolatile memory 8 are subjected to a logical operation to output the result to switch 7. If, at this time, switch 7 is ON, the result of operation in second operator 6 is written into second data 22a (the predetermined bit therein is rewritten), while, if switch 7 is OFF, the result of operation in second operator 6 is not written into second data 22a and hence second data 22a is kept unchanged.

First data 21a and second data 22a operate in pairs. Namely, based on the condition of first data 21a, an output corresponding thereto is produced as second data 22a.

With reference to FIG. 2, the operation just mentioned above will be discussed in detail below.

First of all, each of the data that are written in nonvolatile memory 8 will be described.

In FIG. 2, the data in RAM 2 and the data in nonvolatile memory 8 are each realized by 8-bit data. A microcomputer engineer or user, when an apparatus with microcomputer 10 mounted therein has deviated from its normal operation, acknowledges that there is a bug present in microcomputer 10. The same, in accordance with the state of the malfunction, specifies second data 22a at second address 22 of RAM 2 where the bug is considered to be present by using, for example, a RAM map having the contents of RAM 2 written therein. Then, the same, in order that second data 22a and first data 21a, which operates pairwise with second data 22a, are specified by means of nonvolatile memory 8, writes the address corresponding to first address 21 into source address 81 of nonvolatile memory 8 and the address corresponding to second address 22 into target address 85 of nonvolatile memory 8.

While it is already known to the microcomputer engineer or user that (01000101) is written as first data 21a at first address 21, the engineer or user writes (00000100) into nonvolatile memory 8 as first mask data 82 for extracting, in first operator 4, the value of the predetermined bit in first data 21a corresponding to the predetermined bit in second data 22a where the bug is present.

The engineer or user further writes comparison data 83 (00000100) to be compared with the extracted bit value by means of first mask data 82 into nonvolatile memory 8. Comparison data 83 is such data that is concurrent with the value of the predetermined bit in first data 21a corresponding to the bit in second data 22a in which the bug is considered to be present. Namely, the value of the predetermined bit is extracted from first data 21a by means of first mask data 82 and it is verified that the bit value is the desired value.

The engineer or user is already aware of the fact that data based on the condition of first data 21a is produced as an output of second data 22a and specifies second address 22 at which second data 22a (00000010) is written by means, for example, of a RAM map. The engineer or user, in order that second address 22 is designated at the time of the bug correction by means of nonvolatile memory 8, writes the address corresponding to second address 22 into target address 85 in nonvolatile memory 8.

Further, the engineer or user writes, into nonvolatile memory 8, second mask data 84 (00100000) for rewriting with another value the predetermined bit in second data 22a at second address 22 specified with target address 85 where the bug is considered present.

Operations will be described below with reference to FIG. 2.

When the apparatus has made a malfunction and it is determined that there is a bug in the microcomputer, the microcomputer engineer or user writes source address 81, first mask data 82, comparison data 83, second mask data 84, and target address 85 into nonvolatile memory 8. The same, then, subjects first data 21a (01000101) chosen with source address 81 and first mask data 82 (00000100) to a logical multiplying operation in first operator 4. Here, first mask data 82 is such data that will, when subjected to the logical operation with first data 21a, extract the value of a predetermined bit (the third bit from the least significant bit in this example) from first data 21a. Hence, the result of the logical multiplication becomes (000000100). The operation result (000000100) is compared with comparison data 83 (000000100) in comparator 5. It is for verifying that the extracted value of the predetermined bit in first operator 4 is the desired value, that comparison data 83 is compared in comparator 5 with the operation result in first operator 4.

On the other hand, second address 22 in RAM 2 is chosen in accordance with target address 85 and, thereupon, second data 22a written at second address 22 and second mask data 84 are subjected to a logical operation in second operator 6. For example, in the state where (00000010) is set as second data 22a at second address 22 chosen in accordance with target address 85 and data (00100000) is stored as second mask data 84, these data are subjected to logical addition in second operator 6. The result of the logical addition becomes (00100010).

If the operation result in first operator 4 and comparison data 83 agree with each other in the comparison in comparator 5, switch 7 is turned ON, whereas, if they disagree, switch 7 is tuned OFF. When switch 7 is turned OFF, namely, when it is not necessary to correct second data 22a, the result of operation in second operator 6 does not affect second data 22a and, hence, the data is left unchanged. However, when switch 7 is ON, the predetermined bit in second data 22a is rewritten with the correct value in accordance with the operation result in second operator 6. In the present embodiment, the data (00000010) which was written in second data 22a before the operation was made is rewritten with (00100010) as the operation result in second operator 6. Namely, since the value of the third bit from the left of second data 22a, which must essentially be "1", was "0", it is rewritten with "1" in accordance with the operation result in second operator 6.

According to the present embodiment, as described above, when there is a bug present in the value of a predetermined bit in second data 22a, by previously writing arbitrary addresses and data for rewriting data into nonvolatile memory 8 connected to microcomputer 10, the value of the predetermined bit of second data 22a is rewritten, and thus the software bug in microcomputer 10 can be corrected. Namely, in the present embodiment the bug correction in the microcomputer can be achieved by preparing only a nonvolatile memory of a relatively small capacity and hence debugging can be implemented at low cost.

Second Embodiment

An example to which the semiconductor apparatus according to the present invention is applied will be described below as a second exemplary embodiment. The example shown in this embodiment is that for bug correction in a microcomputer which is generally used in video tape recorders and performs operation control by detecting an erroneous erasure preventing lug, or a safety lug.

When a video tape recorder including a microcomputer has made a malfunction or when it is desired to partly change the function performed by the microcomputer, it becomes necessary to modify software in the microcomputer. In such case, it has so far been required to make such a great change as to fabricate the mask ROM again. In the present embodiment, however, such a software change or modification can be achieved at relatively low cost by having the erroneous data causing the bug, for example, in the RAM (data area) in the microcomputer rewritten with right data by means of a nonvolatile memory externally connected to the microcomputer. Such a nonvolatile memory is previously mounted in the video tape recorder in connection with the microcomputer. When the video tape recorder has made a deviation from its normal operation, arbitrary source address data and target data for specifying an address in the RAM at which the data correction is to be made, as well as mask data and comparison data to be used in the actual data correction, are written into the nonvolatile memory by the user. By supplying power to the video tape recorder after the data as above have been written in, rewriting of the RAM data is carried out.

In the state of the nonvolatile memory just connected to the microcomputer and having no such data as described above written therein, i.e., before the nonvolatile memory stores the data capable of rewriting RAM data, there are values "0" written at each address of the nonvolatile memory.

FIGS. 3(a) and 3(b) are perspective views showing appearances of a tape cassette for use in a video tape recorder, of which FIG. 3(a) shows the tape cassette with the safety lug remaining intact (for allowing recording) and FIG. 3(b) shows the tape cassette having the safety lug taken away (not allowing recording). Reference numeral 31 denotes a tape cassette and 32 denotes a detection portion for preventing erroneous erasure constituted of presence or absence of a lug, or an open or shut door.

Figure 4:
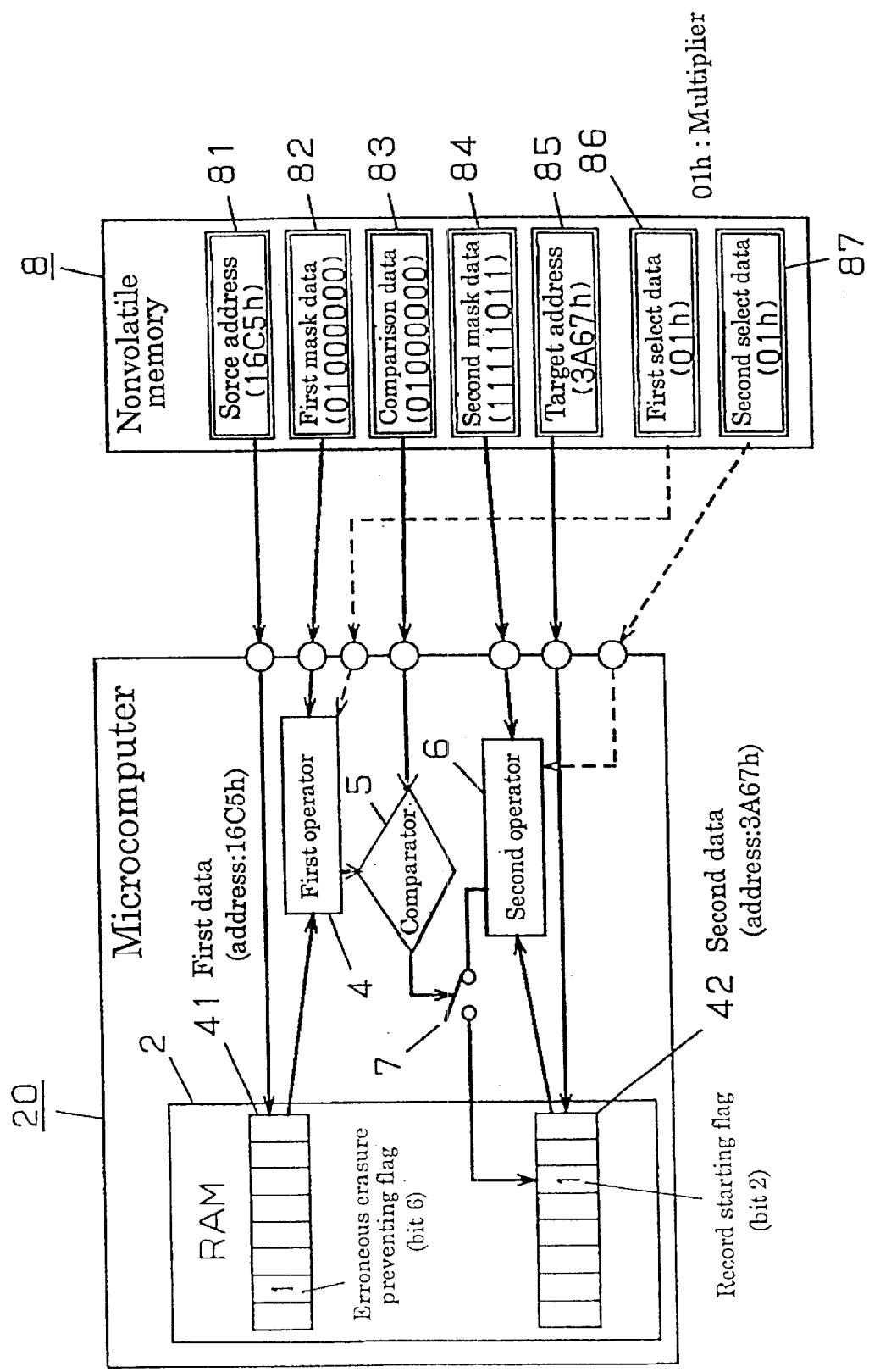
FIG. 4 is a block diagram showing a structure of the semiconductor apparatus according to the second embodiment.
Figure 5:
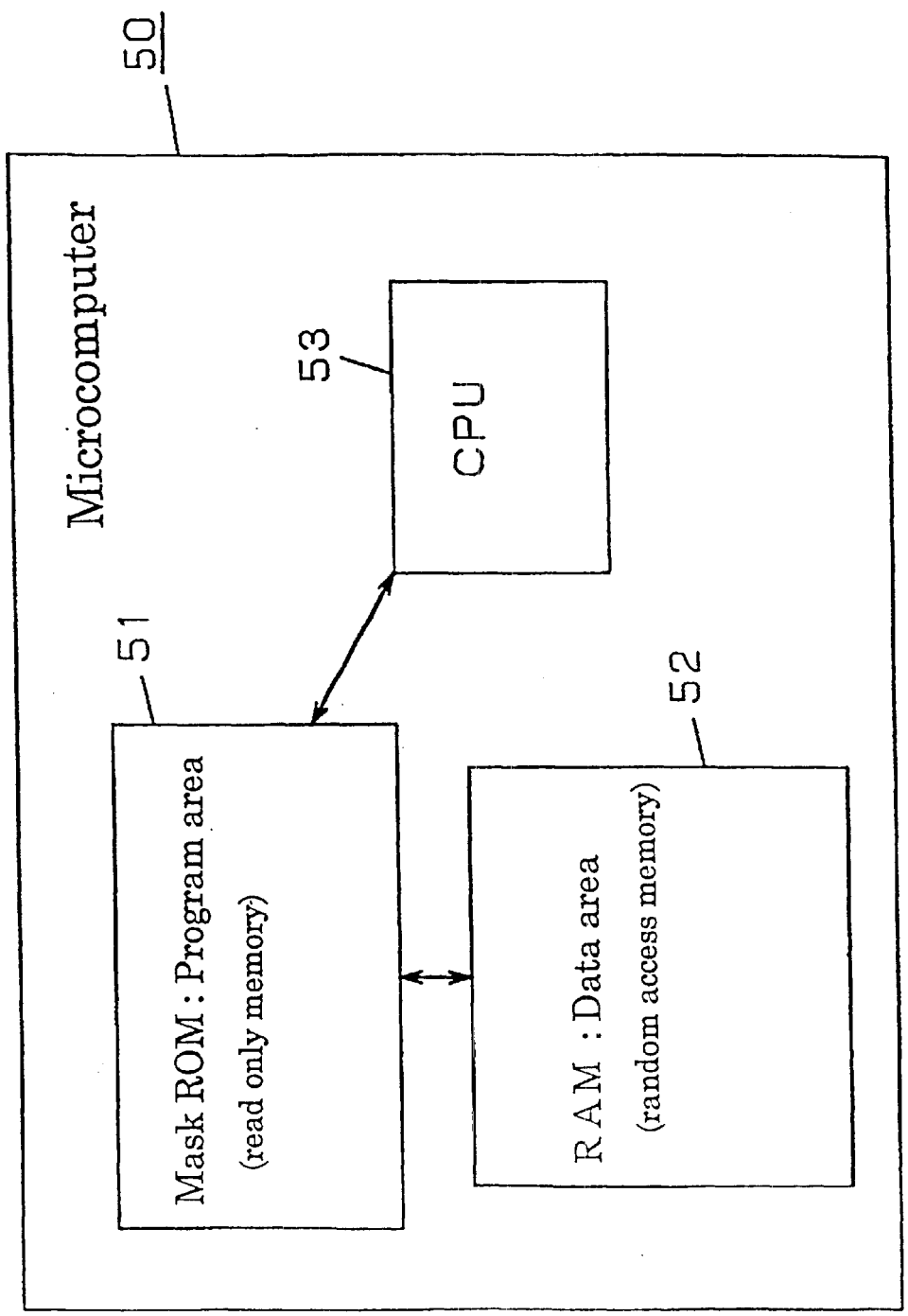
FIG. 5 is a block diagram showing a structure of a conventional semiconductor apparatus.

FIG. 4 is a block diagram showing a structure of the present embodiment. For convenience of explanation, illustration of mask ROM and CPU as used in the embodiment 1 are omitted here. In FIG. 4, microcomputer 20 is a control unit for controlling the electronic apparatus, while nonvolatile memory 8 is a storage unit connected to microcomputer 20 for storing data for correcting a bug in microcomputer 20. Within nonvolatile memory 8 are disposed source address 81 for specifying an arbitrary address at which first data 41 is recorded in RAM 2, first mask data 82, which, together with first data 41, are subjected to a logical operation, comparison data 83 to be compared with the result of the operation in first operator 4, second mask data 84, which, together with second data 42, are subjected to a logical operation, and target address 85 for specifying the address of second data 42. Each of these data can be changed to any data at will by the microcomputer engineer. Nonvolatile memory 8 is previously put into connection with microcomputer 20, and when the apparatus has made a malfunction and it is found that there is a bug within microcomputer 20, the microcomputer engineer writes the data as mentioned above into nonvolatile memory 8.

RAM (Random Access Memory) 2 is a rewritable memory with a data area. At the addresses in the data area of RAM 2, first data 41 and second data 42 are written.

First operator 4 is a first operation unit for performing a logical operation on first mask data 82 from nonvolatile memory 8 and first data 41. Although the same is set as a multiplier in the present embodiment, it can be set as an adder, or another operator, according to the setting of first select data 86 as will be discussed later. More particularly, when first operator 4 is used as a multiplier, a multiplying operation is performed on first data 41 in RAM 2 and first mask data 82 in nonvolatile memory 8 to deliver the result of operation to comparator 5. When first operator 4 is used as an adder, an adding operation is performed on first data 41 in RAM 2 and first mask data 82 in nonvolatile memory 8 to deliver the result of operation to comparator 5. Any of the operations is for extracting the predetermined bit in first data 41.

Comparator 5 is a comparison unit for comparing the operation result in first operator 4 with comparison data 83 thereby ON/OFF controlling switch 7, which will be discussed later. In the present embodiment, comparator 5 operates such that switch 7 is turned ON when the operation result in first operator 4 and comparison data 83 agree with each other. Namely, it verifies existence of agreement between the value of the predetermined bit of first data 41 extracted by first operator 4 and comparison data as the desired data.

Switch 7 is a switch unit for switching ON (make)/OFF (break) in accordance with the operation result in comparator 5. Namely, it switch-selects whether or not the operation result in second operator 6, described later, should be written into second data 42.

Second operator 6 is a second operation unit performing logical operation on second data 42 and second mask data 84. Although the same is set as a multiplier in the present embodiment, it can be set as an adder, or another operator, according to the setting of second select data 86 as will be discussed later. More particularly, when second operator 6 is used as a multiplier, a multiplying operation is performed on second data 42 in RAM 2 and second mask data 84 in nonvolatile memory 8 to deliver the result of operation to switch 7. When second operator 6 is used as an adder, an adding operation is performed on second data 42 in RAM 2 and second mask data 84 in nonvolatile memory 8 to deliver the result of operation to switch 7. Any of the operations is for extracting the predetermined bit in second data 42. First select data 86 is capable of choosing either a multiplier or an adder as first operator 4. Second select data 87 is capable of choosing either a multiplier or an adder as second operator 6. Multipliers are designated when first and second select data 86 and 87 are set at (01h), while adders are designated when they are set at (02h).

In microcomputer 20, there are RAM 2, first operator 4, comparator 5, second operator 6, and switch 7.

Operation of the semiconductor apparatus of the present embodiment arranged as above will be described below.

Tape cassette 31 for use in a video tape recorder is provided with an erroneous-erasure preventing portion 32 (it is a lug in the present embodiment) on one side of the cassette. According to the rules, the cassette is recordable when the lug is present (FIG. 3(a)), while it is not recordable when the lug is taken away. For controlling a video tape recorder using such a tape cassette, a microcomputer with a mask ROM mounted therein is used.

Suppose now that such a malfunction occurred in software of the video tape recorder of the above described structure that, for example, a recording operation was made in spite of the lug for preventing erroneous erasure being absent (broken). Although a failure in the detection mechanism can also be considered as the cause of the malfunction, it is presupposed in the description of the present embodiment that the malfunction is caused by a bug in software within the microcomputer. A malfunction due to a software bug as described above arises when there is a software error in the relationship between "erroneous erasure preventing flag" which becomes "1" when the safety lug is absent (broken) and "record starting flag" which controls the recording operation not to be made when the erroneous erasure preventing flag is "1". Incidentally, a recording operation is started when "record starting flag" is "1" and it is not started when the flag is "0".

The record starting flag should normally be set at "0" (not to start recording operation) in the state of the erroneous erasure preventing flag being set at "1" (the safety lug is broken). If, despite that, the record starting flag is set at "1" (to start recording operation) in the state as described above, the video tape recorder will produce a malfunction as mentioned above. In the event of such a malfunction, this apparatus is operated such that the portion related to the record starting flag in the RAM data area is rewritten to cause the record starting flag to be set to "0" (not to make a recording operation) when the erroneous erasure preventing flag is set at "1". As a result, the software bug is removed thereby eliminating the need for making the mask ROM anew.

Operations will be described concretely with reference to FIG. 4.

In FIG. 4, nonvolatile memory 8 as connected with microcomputer 20 is disposed within the video tape recorder. Since, at this time, values "0" are initially written at all addresses of nonvolatile memory 8, such an operation is prevented from occurring that data in RAM 2 are rewritten accidentally. In such a video tape recorder, if a malfunction to start recording operation has occurred in spite of the lug of detecting portion for preventing erroneous erasure 32 being absent and it has been known that the malfunction is due to a bug in microcomputer 20, the microcomputer engineer, in the first place, writes relevant data into nonvolatile memory 8 following the procedure as mentioned below.

Here, it is presupposed that the microcomputer engineer or user already knows the address and bit at which an erroneous erasure preventing flag is written and the address and bit at which a record starting flag is written within RAM 2. In accordance with the known information, let it be assumed that the erroneous erasure preventing flag, as first data 41, is written in the second bit from the left at address (16C5h) of RAM 2 and the record starting flag, as second data 42, is written in the sixth bit from the left at address (3A67h) of RAM 2. Then, the engineer or user writes such data into nonvolatile memory 8 as:

source address 81 (16C5h) as an arbitrary address;

data (01000000) as first mask data 82 for reading out the second bit from the left of first data 41;

data (01000000) as comparison data 83 for comparing with an operation result in first operator 4;

data (11111011) as second mask data 84 for rewriting the sixth bit from the left of second data 42; and (3A67h) as target address 85 for specifying the address of second data 42.

As comparison data 83, such data is written that, when compared with the result of operation in first operator 4, will agree with the result of operation on first data 41 and first mask data 82 when the erroneous erasure preventing flag is "1". Namely, this data is used for correcting second data 42 when the erroneous erasure preventing flag is "1". When the erroneous erasure preventing flag is "0" (i.e., there is the safety lug present, it is not necessary to correct second data 42. Therefore, second data 42 is not changed when the operation result in first operator 4 and comparison data 83 disagree. Incidentally, a dedicated writing device may be used as a method of writing data into nonvolatile memory 8.

As first select data 86, (01h) is written so that first operator 4 operates as a multiplier, and as second select data 87, (01h) is written so that second operator 6 operates as a multiplier. Further, as second mask data 84, data (11111011) which, when used in the multiplying operation in second operator 6, will allow the sixth bit from the left of second data 42 to be changed from (1) to (0).

Thus, arbitrary address (16C5h) of RAM 2 is designated with source address 81 of nonvolatile memory 8 and first data 41 (01000000) written at the address is read out. First data 41 thus read out is fed to first operator 4. In first operator 4, a multiplying operation on first data 41 (01000000) and first mask data 82 (01000000) in nonvolatile memory 8 is carried out. Namely, the value of the bit of first data 41 in which an erroneous erasure preventing flag is written is extracted. The result of operation becomes (01000000) and this operation result is fed to comparator 5. Comparator 5 compares the operation result (01000000) in first operator 4 with comparison data 83 (01000000) in nonvolatile memory 8. Since these data agree with each other (namely, the erroneous erasure preventing flag (the second bit from the left) is set at 1), control is made to turn switch 7 ON.

On the other hand, the address of second data 42 in RAM 2 is designated with target address 85 (3A67h) and second data 42 (00000100) is read into second operator 6. In second operator 6, second data 42 (00000100) and second mass data 84 (11111011) are subjected to a multiplying operation. The result of the operation becomes (00000000). Namely, it is designed so that the value of the bit desired to be corrected (the sixth bit from the left) is changed from (1) to (0), whereas other bits than that desired to be corrected are all set at "1" so that the values therein may not be changed through the operation in second operator 6.

When switch 7 is turned ON, the operation result in second operator 6 is written into second data 42. At this time, although second data 42 had the record starting flag (the sixth bit from the left) set at "1" before being subjected to the operation in second operator 6, it is rewritten with the result of operation in second operator 6 and, hence, the record starting flag in second data 42 becomes "0". Consequently, when the erroneous erasure preventing flag (the second bit from the left) of first data 41 is "1", such an operation is performed that the record starting flag (the sixth bit from the left) of second data 42 becomes "0". Thus, the bug that causes recording to start in spite of absence of the safety lug can be eliminated.

When microcomputer 20 debugged as described above is operated in a video tape recorder, a recording operation at the recording instruction given by the operator is performed with tape cassette 31 whose erroneous erasure preventing lug 32 is present (refer to FIG. 3(*a*)), while no recording operation is made and normal operation is kept on with tape cassette 31 whose erroneous erasure preventing lug 32 is absent (refer to FIG. 3(*b*)) even if a wrong instruction to record is given by the user.

According to the present embodiment as described above, arbitrary data of first and second mask data 82 and 84, source address 81, comparison data 83, and target address 85 are written into nonvolatile memory 8. Then, first data 41 in RAM 2 is extracted with source address 81, an erroneous erasure preventing flag is read out with first mask data 82 from first data 41 having the erroneous erasure preventing flag written therein, the same is compared with comparison data 83, and, when the same agrees with comparison data 83, the result of operation in second operator 6 on second data 42 with a record starting flag written therein and second mask data 84 is written into second data 42. Thereby, it is attained to correct second data 42 such that the record starting flag therein is set to "0" when the erroneous erasure preventing flag is "1". Thus, an excellent effect can be obtained that bug correction in a microcomputer is realized at low cost by means of a nonvolatile memory of a small capacity.

Further, since the microcomputer engineer is able to designate the source address and target address and set various data in nonvolatile memory 8 in accordance with each bug, debugging can be made against each of various bugs without changing the mask ROM.

Although first and second operators 4 and 6 were described as multipliers in the present embodiment, either or both of the first and second operators can be set up as an adder or the like by changing first and second select data 86 and 87 in nonvolatile memory 8. Although the operator was described to be selectively set up as a multiplier or an adder in the present embodiment, it can also be established as another type of operator such as a divider.

The present embodiment, as described above, provides an excellent effect that software debugging can be achieved without changing the mask ROM or writing part of the program area into a nonvolatile memory external to the microcomputer, but at low cost by means of a nonvolatile memory of a small capacity.

Further, in correcting a bug of the microcomputer, the need for fabricating the microcomputer again by subjecting the same, in the state of a wafer, to the process of diffusion can be eliminated. Therefore, such an excellent effect is obtained that great cost reduction can be achieved.

What is claimed is:

1. A semiconductor apparatus comprising:
   a control unit with first and second data written therein; and
   a storage unit storing
      first and second mask data,
      comparison data,
   a source address, and
   a target address, wherein
   arbitrary data of the first and second mask data, the comparison data, the source address, and the target address are written into said storage unit having values "0" initially written therein, and wherein
   the first data is extracted in accordance with the source address, a first operation is performed on the first data and the first mask data, the result of the first operation is compared with the comparison data, the second data is extracted in accordance with the target address, a second operation is performed on the second data and second mask data, and whether or not the result of the second operation is written into the second data is determined in accordance with the result of the comparison.

* * * * *